May 26, 1970     A. MACOVSKI     3,514,181
HIGH SPEED LIGHT SCANNING SYSTEM
Filed May 31, 1966
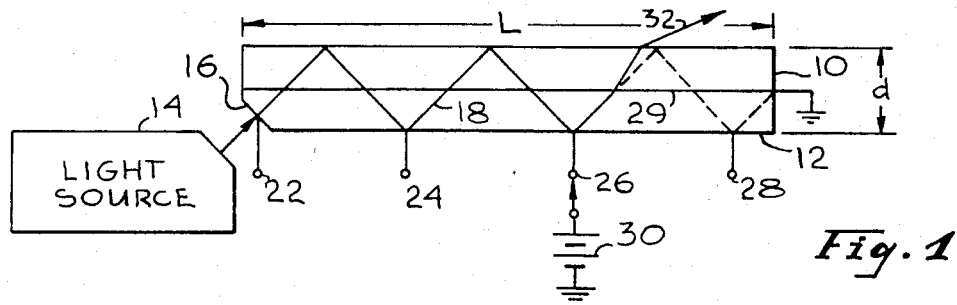
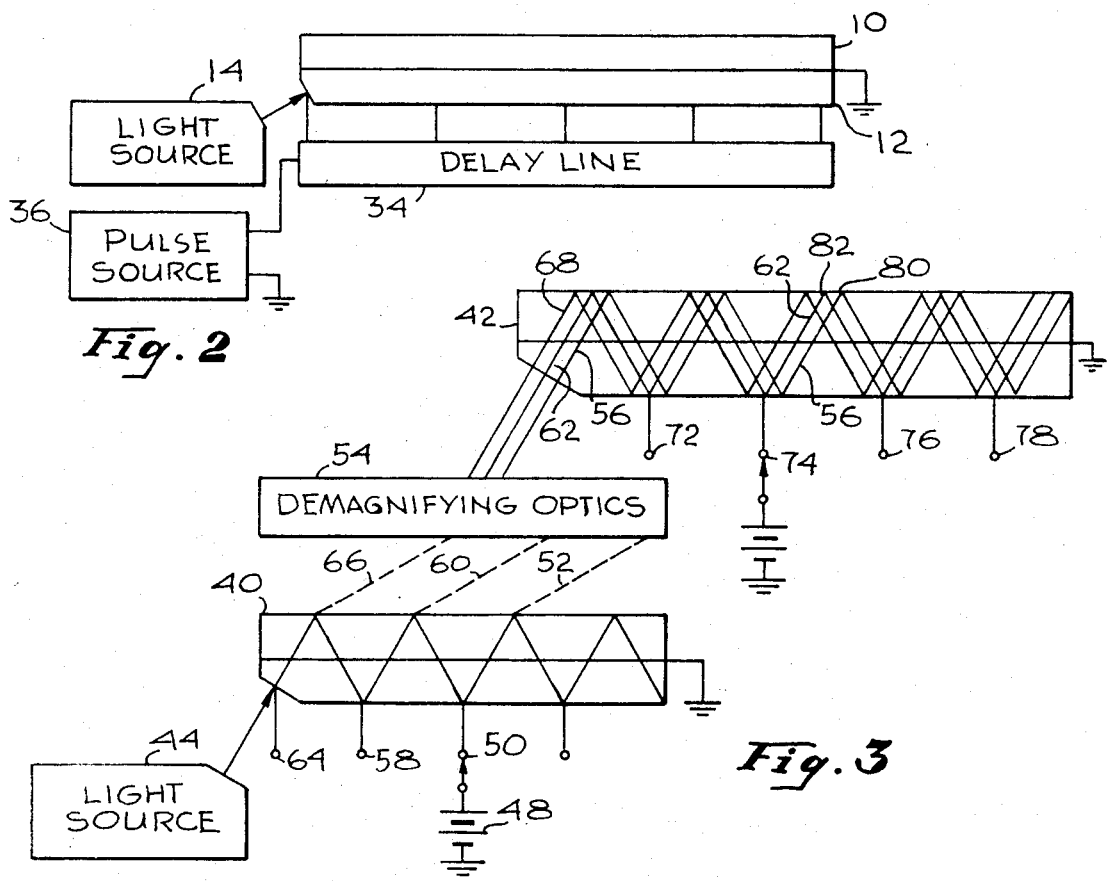
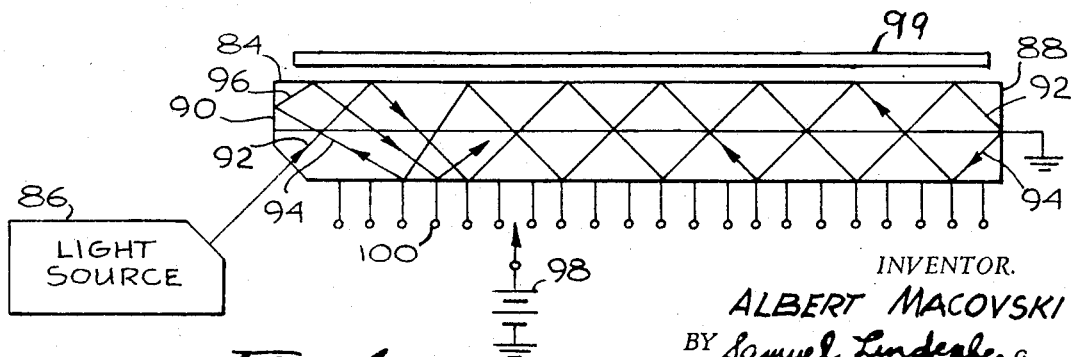
INVENTOR.
ALBERT MACOVSKI
BY Samuel Lindenberg
Arthur Freilich
ATTORNEYS United States Patent Office
3,514,181
Patented May 26, 1970

3,514,181
HIGH SPEED LIGHT SCANNING SYSTEM
Albert Macovski, Palo Alto, Calif., assignor to Stanford Research Institute, Menlo Park, Calif., a corporation of California
Filed May 31, 1966, Ser. No. 554,173
Int. Cl. G02f 3/00, 1/26
U.S. Cl. 350—150                          4 Claims

ABSTRACT OF THE DISCLOSURE

A high speed light scanning system is provided by joining together a slab of a birefringent material and a slab of an electro-optic material. Light from a source such as a laser or polarized light source, is directed at a corner of the electro-optic material. It is then reflected back and forth at the air interfaces of the crystals. At spaced points along the length of the electro-optic material, provision is made for applying a potential to establish an electric field thereacross whereby the polarization of light passing through that region of the electro-optic material is rotated. This causes the polarized light to be emitted as a light ray from the birefringent material at a point adjacent to the location from which it would otherwise be reflected back through the birefringent material. Scanning is achieved by successively establishing the electric field at spaced locations along the electro-optic material.

---

This invention relates to systems for deflecting the light from a single source selectively to predetermined points over an area at electronic speeds, and more particularly to improvements therein.

The large light output of light sources, such as lasers, makes them suitable for large screen displays. While intensity modulation of the laser light beam at video rates has been accomplished, deflection of the light beam over a large number of resolvable spots is yet to be accomplished adequately. Light deflection may be presently accomplished by mechanical means which employ rotating mirrors. Although this is suitable for relatively slow scan rates, such as the field rate of television displays, at higher scan rates difficulties arise.

An object of this invention is to provide a light deflection system which operates at a higher speed than heretofore achievable.

Yet another object of the present invention is the provision of a novel and improved light deflection system.

Still another object of this invention is the provision of a simple arrangement for achieving a high speed light scanning system for a high intensity light source.

These and other objects of the present invention may be achieved by joining together a slab of a birefringent material and a slab of an electro-optic material. Light which is caused to shine into one corner of the two joined slabs, say the electro-optic material corner, will bounce back and forth along the length of the two joined slabs, due to complete internal reflection at the air interfaces. A localized electric field may be applied to the electro-optic material at any location along its length, in order to change the polarization of the light passing within the region of the electric field. As a result of the change in polarization, the light passing through the electro-optic material into the birefringent material will pass out of the birefringent material at the air interface. From the foregoing, it should be appreciated that a light scanning operation may be achieved by successively moving the location at which the electric field is applied along the length of the electro-optic material. This can be done by, for example, using tapped delay line with its taps connected to the electro-optic material and applying a pulse of voltage to one end of the tapped delay line.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIG. 1 is a schematic view of an embodiment of the invention;

FIG. 2 shows the arrangement of FIG. 1 combined with a delay line for providing a true scanning action;

FIG. 3 illustrates an arrangement for an embodiment of the invention which minimizes the length and light loss required for illuminating a given number of points; and FIG. 4 shows another arrangement for minimizing length and light loss required for illuminating a given number of points.

Reference is now made to FIG. 1, which is a schematic representation of an embodiment of this invention. It comprises a birefringent crystal 10 or slab of birefringent material which is joined with a slab of an electro-optic material 12, in a manner so that light from a source 14, which may be a laser or a polarized light source, which is directed on a corner 16 of the electro-optic material 12, will be reflected back and forth at the air interfaces of the crystals, in the manner represented by the saw tooth line 18. The electro-optic material has the property that when a localized electric field is applied to a portion thereof, a light ray passing through this field has its plane of polarization changed. The index of refraction of the birefringent material is different for vertically and horizontally polarized waves. The angle of light used is such as to be beyond the critical angle at the air interface for the higher index, causing complete internal reflection, and below the critical angle for the lower index, causing transmission.

Advantage of this phenomenon is taken in the structure shown in FIG. 1. A plurality of terminals 22, 24, 26, 28, which are connected to spaced points along one surface of the electro-optic material 12, while the other surface 29 of the electro-optic material, which is in contact with the surface of the birefringent material is connected to ground. A source of potential 30 may be selectively connected to any one of the terminals 22 through 28 and ground. It is shown connected to the terminal 26. As a result, an electric field exists through the electro-optic material in the region adjacent where terminal 26 contacts the crystal. The light which passes through that region is rotated in polarization, with the result that it will be emitted as a light ray 32, from the birefringent material, at a point adjacent to the location from whence it would otherwise be reflected back through the birefringent material.

It should be appreciated that by the selective contacting of any one of the terminals 22 through 28 with the source of potential 30, light will be emitted from the surface of the birefringent material at a point which, while not quite opposite the location where the electric field is applied, is substantially close to it. Thus, by using electronic switching techniques, for the purpose of selectively applying a source of potential to the terminals one can selectively deflect the light from an intense light source such as a laser at electrical speeds.

To achieve scanning, the technique schematically represented in FIG. 2 may be employed. A tapped delay line 34 may be connected to the plurality of terminals which are made to contact the surface of the electro-optic material 12, at spaced points therealong. A pulse from a pulse source 36 is applied to one end of the delay line and as it proceeds down the delay line, it applies an electric field successively across the electro-optic material length whereby the light from the opposite surface of the birefringent material successively scans along the length thereof. In order to minimize reflections at the interface of the electro-optic and birefringent surfaces, materials with substantially similar indices of refraction can be used. A birefringent material such as calcite has an index of refraction for the extraordinary wave of 1.49 while many electro-optic materials have substantially similar indices (nitro benzine—1.55, AEP—1.52, KDP—1.51). Since only one critical surface is involved, if the indices do differ, a quarter wave film of material whose index is the geometric mean of that of the electro-optic and birefringent crystals can be evaporated between the two slabs of material to provide lossless transmission at the operating wavelength.

Assuming that the losses between the materials are negligible, a multiple element deflector for a display can be made by simply making the slabs long enough. For indices on the order of 1.5, the required length of the slab is given by $L=1.8\ Nd$, where $N$ is the number of resolvable positions and $d$ the thickness of the entire structure.

FIG. 3 shows an arrangement for minimizing the length of material required as well as the light loss for selectively illuminating a predetermined number of points. Two or more deflectors respectively 40, 42 of the same type shown in FIGS. 1 and 2, are employed with the demagnified output of one forming a light input to the other. By a demagnified output is meant that the light emitted from the first deflector is passed through a lensing arrangement which collects the light and directs it into the entrance corner of the second deflector. The total number of points which may be illuminated is the product of those on each deflector. Thus, for example, two deflectors which can selectively illuminate twenty points, while three deflectors with ten on each will provide one thousand points, the system minimizes the required length and the number of reflections within a given deflector to obtain a given number of elements.

As seen in FIG. 3, light from the source 44 is reflected in the manner of the saw tooth line 46, within the deflector 40. Should light be emitted at any one of the points along the surface of the deflector 40, for example, as a result of applying an electric field by means of the potential source 48 to one of the terminals 50, the emitted light, represented by the dotted line 52, is focused by the demagnifying optics 54, into the entrance surface of the deflector 42. The light ray will follow the path, represented by the saw-tooth line 56, in being reflected between the outer surface of the deflector 42.

If the deflector 40 had an electric field applied by connecting the source of potential 48 to the terminal 58, then the demagnifying optics would direct the light ray 60 into the end of the deflector 42 and the light there would follow the path represented by the line 62. Should the potential source 48 be connected to the terminal 64, then the light emitted from the deflector 40 represented by the dotted line 66, would be directed into the entrance surface of the deflector 42 where it would follow the light path represented by the saw tooth line 68. Thus, each light beam emitted from the deflector 40 and directed by the demagnifying optics 54 into the deflector 42 follows a light path displaced from every other light beam but has the same number of reflections as every other light beam.

Accordingly, the location at which light will be emitted from the deflector 42 is determined by the location at which the potential source 48 makes connection with the contacts associated with the deflector 40, and the location at which a second potential source 70, makes contact with one of the terminals 74, of the terminals associated with the deflector 42. Thus, the voltage source 48 is connected to terminal 50 and the voltage source 70 is connected to terminal 74. The light beam which is emitted is the one which has taken the path 56. This will be emitted at a point designated by the reference numeral 80.

If the potential 70 remains connected to the terminal 74, and the potential source 48 is moved to the contact 58, then the light beam will be emitted from the point on the surface of the deflector 42, designated by the reference numeral 82, which is where the light beam following the path 62 would be emitted. In the example shown in FIG. 3, there are twenty possible points on the surface of the deflector 42 from which light rays may be emitted, as a result of combining this emitter with the demagnifying optics 54 and the emitter 40, as contrasted to only five possible points of light emission which would be obtained from the detector 42 if it were used alone.

FIG. 4 represents another arrangement for minimizing the required length of a deflector 84. In the arrangement shown in FIG. 4 light from the source 86 is permitted to be reflected from the ends respectively 88, 90 of the deflector, in the manner represented by the saw tooth lines 92, 94, 96, so as to provide a larger number of available positions for the exit light beam. Depending upon where the electric field is applied by connecting the potential source 98 to any one of the terminals 100, either a forward or backward traveling wave will be allowed to emerge. This system reduces the length of the deflector without however altering the loss considerations. In addition, it introduces some ambiguity as to the position of the emerging beam, depending upon whether a forward or backward wave is used. It does, however, provide a relatively simple structure. A diffusing structure 99 can be placed along the light exit surface to make the output illumination independent of direction.

Any of the structures shown can be used for display or sequential data readout systems at very high rates. For very high speed systems, distributed rather than lumped lines can be used in conjunction with the electro-optic material to provide the sequential switching operation.

There has accordingly been shown and described herein a novel, useful and simple system for deflecting light from a high intensity source either in a scanning manner or to predetermined positions at higher speeds than heretofore achievable. While a single light source and deflector, in accordance with this invention have been shown, whereby light deflections along a line are achieved, those skilled in the art will appreciate that an area scan may be achieved such as by using a large area deflector with a single deflector scanning along the light entry corner of the large area deflector whereby the region which receives light is determined by the location at which an electric field is applied to the single deflector. Alternatively, a single deflection element may be used which is mechanically pivoted or which emits its light to a mirror which is mechanically pivoted. It will be appreciated however, that this will not operate as quickly as the first described arrangement.

What is claimed is:

1. A light deflector comprising a slab of a birefringent material having a light reflecting surface and a surface opposite said light reflecting surface, a slab of an electro-optical material having a light reflecting surface and a surface opposite said light reflecting surface, the surfaces of said birefringent material slab and said electro-optical material slab opposite said light reflecting surfaces being in contact with one another, means for directing light into said electro-optical material at a region adjacent its light reflecting surface, whereby said light is totally internally reflected for a given polarization at the light reflecting surfaces of said electro-optical material slab and said birefringent material slab, said light being reflected between the light reflecting surfaces of said electro-optical material slab and said birefringent material slab and being directed along the lengths of said electro-optical material slab and said birefringent material slab, and means for applying an electric field across a predetermined one of a plurality of discrete spaced regions along the length of said electro-optical material, said electric field extending between its light reflecting surface and its opposite surface said means comprising a source of potential and means for selectively connecting said source of potential between said light reflecting surface and said opposite surface of said electro-optical material slab at discrete, spaced points along the reflecting surface of said electro-optical material slab, whereby the light passing through said electric field has said given polarization changed and can pass through the light reflecting surface of said birefringent material adjacent the region of said electro-optical material at which said electric field is established.

2. Apparatus as recited in claim 1 wherein said means for selectively connecting said source of potential between said light reflecting surface and said opposite surface of said electro-optical material slab at discrete, spaced points along said reflecting surface of said electro-optical material slab comprises delay line means having a plurality of taps connected to a plurality of discrete spaced locations along the reflecting surface of said electro-optical material, and means for applying a pulse to one end of said delay line means whereby an electric field is successively applied to said discrete spaced points along the length of said electro-optical material.

3. Apparatus as recited in claim 1 wherein said means for applying light to one end of said electro-optical material adjacent its reflecting surface includes a second light deflector comprising a slab of electro-optical material having a reflecting surface and a surface opposite said reflecting surface, a slab of birefringent material having a reflecting surface and an opposite surface in contact with the opposite surface of said slab of electro-optical material, means for directing light into said deflector at a region adjacent the light reflecting surface of said electro-optical material, said light being totally internally reflected for a given polarization at the light reflecting surfaces of said electro-optical material and said birefringent material, and said light being reflected between the light reflecting surfaces of said electro-optical material and said birefringent material and along the lengths of said electro-optical material and said birefringent material, means for selectively applying an electric field across a predetermined one of a plurality of discrete spaced regions along the length of said electro-optical material slab said electric field extending between its reflecting surface and opposite surface to cause light to be emitted from said birefringent material in a region adjacent the location of said electric field in said electro-optical material, and means for directing light emitted from the reflecting surface of said birefringent material into the region adjacent the light reflecting surface of said electro-optical material of said first light deflector.

4. Apparatus as recited in claim 1 wherein said slabs of electro-optical material and birefringent material each have ends which are perpendicular to their reflecting surfaces and opposite surfaces, said ends also having the property of reflecting light internal to said material.

References Cited

UNITED STATES PATENTS

| | | |
|---|---|---|
| 3,432,222 | 3/1969 | Fleisher et al. |
| 3,243,724 | 3/1966 | Vuylsteke _____ 350—150 |
| 3,379,486 | 4/1968 | Ujhelyi et al. _____ 350—150 |
| 3,391,972 | 7/1968 | Harris et al. _____ 350—150 |

OTHER REFERENCES

Fleisher et al.: "Digital Indexed Angular Light Deflection System," IBM Technical Disclosure Bulletin, vol. 6, No. 5 (October, 1963) pp. 32–34.

DAVID SCHONBERG, Primary Examiner

P. R. MILLER, Assistant Examiner

U.S. Cl. X.R.

350—152, 157